United States Patent [19]

Zupancic

[11] Patent Number: 4,774,848

[45] Date of Patent: Oct. 4, 1988

[54] WORM REDUCTION GEAR

[76] Inventor: Viktor Zupancic, Cesta v gorice 10/d, 61111 Ljubljana, Yugoslavia

[21] Appl. No.: 905,273

[22] Filed: Sep. 8, 1986

[30] Foreign Application Priority Data

Sep. 10, 1985 [YU] Yugoslavia ............................ 1418/85

[51] Int. Cl.[4] ............................................. F16H 1/16
[52] U.S. Cl. ..................................... 74/425; 198/672; 198/675; 384/539; 384/903; 74/606 R
[58] Field of Search .............. 74/425, 426, 458, 89.14, 74/606 R, 421 A; 198/672, 673, 674, 675; 384/539, 551, 903; 277/57

[56] References Cited

U.S. PATENT DOCUMENTS

| | | | |
|---|---|---|---|
| 1,737,228 | 11/1929 | Exton | 384/903 X |
| 1,843,875 | 2/1932 | Kendall et al. | 74/425 |
| 2,108,262 | 2/1938 | Jones . | |
| 2,225,957 | 12/1940 | Korff | 74/425 |
| 2,272,454 | 2/1942 | Wilfley | 277/57 X |
| 2,288,849 | 7/1942 | Schwitzer | 198/674 X |
| 2,351,060 | 6/1944 | McLauthlin | 74/421 A |
| 2,509,526 | 5/1950 | Reynolds, Jr. | 74/425 X |
| 2,763,471 | 9/1956 | Richterkessing | 74/425 X |
| 3,964,335 | 6/1976 | Gerard | 74/425 |
| 4,261,218 | 4/1981 | Eagan . | |
| 4,428,250 | 1/1984 | Becker et al. | 74/425 |

FOREIGN PATENT DOCUMENTS

| | | | |
|---|---|---|---|
| 2345627 | 3/1977 | France . | |
| 3016844 | 2/1981 | Fed. Rep. of Germany | 74/425 |
| 3337059 | 5/1984 | Fed. Rep. of Germany . | |
| 1276068 | 10/1961 | France | 74/425 |

Primary Examiner—Lawrence Staab
Attorney, Agent, or Firm—Herbert Dubno

[57] ABSTRACT

A worm reduction gear has a casing formed by a pair of tubes oriented at right angles between another and respectively receiving a wormwheel shaft and a wormshaft. In the tube receiving the wormwheel shaft, the wormwheel is flanked by a pair of bearings held by respective bushings prevented from axial displacement by C-clips received in respective grooves adjacent the respective end of that tube. The worm on the wormshaft meshing with the wormwheel is also supported by bearings in the respective tube and at one end of one tube, at least, and preferably an end of the tube receiving the wormwheel, a flange is formed.

4 Claims, 5 Drawing Sheets

WORM REDUCTION GEAR

The entire gear has only half the weight of other existing gear types. It is simple to assemble and disassemble; these two operations can also be done by robot. A great advantage of this reduction gear is the fact that the gear cannot be assembled unsatisfactorily: once assembled, it is well assembled and well sealed.

FIELD OF THE INVENTION

1. Engineering Field

The present invention relates to worm reduction gearing and application thereof.

2. Objects of the Invention

It is the object of the invention to simplify a worm reduction gear, to make it easy to manufacture, to make it widely applicable, and to make it less costly, especially in terms of materials and energy.

It is another object of the invention to achieve a structure capable of enduring higher loads with a reducing gear of less weight, using less material and occupying less space.

The worm reducing gear of the invention is intended to eliminate the need for manual work, and can be manufactured by machine, preferably automatically, in mass production.

It is another object of the invention to provide a reducing gear which has only the parts which are absolutely necessary, these being as simple as possible, and a structure which is stronger, i.e. strong enough to make it possible to build in, in the same casing, weaker or stronger driving components like a worm, worm-wheel, a shaft, bearings, etc., in order to make the product less expensive.

Advantageously the reducing gear should be capable of bearing driven structures and of steering, by turning in the center of the driving shaft, the wheels which should be fastened on the shaft either both on the same side of the shaft or one on each side of the shaft. These wheels should turn about the vertical and the horizontal axes. The control of the reduction gear on a mobile machine may be supplied by another reduction gear, by a cogwheel and a toothed rack, or manually by a lever.

BACKGROUND OF THE INVENTION

The state of the art in worm reduction gearing has long been almost unchanged. Worm reduction gears have been made with a standard box-like casing to which a cover is screwed on either side in which a bearing and a seal are placed and which extend in a base in which two bores are cut through for fastening the worm reduction gear. On its ends the worm reduction gear has covers screwed to the casing.

As they have been constructed heretofore, worm reduction gears are not suitable for manufacture on automatic machines and robots. As a result, they are excessively expensive and do not have widespread availability. They are not suitable for simultaneous bearing and driving of the same loads. Sealing and centering are imperfect and unreliable. The existing reduction gear types are complicated to assemble; the worm and the worm wheel are not always fixed within the tolerances required because the assembly depends more or less on a human factor—the engine-fitter, who has to hold the sides of the worm reducing gear casing in his hands while trying to adjust them with gaskets and bolts during his assembly of the unit.

Conventional worm reduction gears do not allow optional installation, suspension, carrying, and driving of the same loads, and do not allow optional location and adaptation to just any user. For the same loads, the existing worm reduction gears are much larger and heavier than they have to be. In addition, in case of known, well established worm reduction gears a great variety of gears are to be made, varying in volume, weight, and power.

SUMMARY OF THE INVENTION

The worm reduction gear according to this invention is so designed that it does not need any bolts or screws. Thus, the product can be manufactured completely by machine, preferably on a lathe. The reduction gear consists of fewer components, those remaining being incomparably simpler, cheaper, and more reliable. Now, a reduction gear can be made by machine, completely automatically, in mass production. In addition, sealing is cheaper, simpler, and more reliable, it does not depend on the quality of the surfaces and on the accuracy of placing the gaskets as much as it did before. The reduction gear can be used with an electromotor provided that the gear is borne directly by the electromotor standing on its standard legs. According to the invention, flat lateral gaskets are replaced by round flange gaskets.

Further, the reduction gear is equipped for bearing and driving a machine and for steering, by turning in the center of the driving shaft, the wheels which should be fastened on the shaft either both on the same side of the shaft or one on each side of it. These wheels rotate about the vertical and horizontal axes. The control of the reduction gear on a mobile machine may be designated to be effected with another reduction gear, with a cogwheel and a toothed rack, or manually with a lever.

A worm reduction gear according to the invention is suitable for a variety of applications. For this purpose, the reduction gear has several connections and supports for bearing attached driving structures and loads at the same time; in case of a fork-lift, these connections and supports can include a connection for a workshop lift and for a construction trade bracket lift, further a connection for vineyard and garden plowing, for transporting manure to a vineyard; a reduction gear designed for conveyor worms and transporters in the processing industry and construction industry. All the needs have been met by worm reduction gears in three casing sizes only.

SPECIFIC DESCRIPTION

Figure 5:
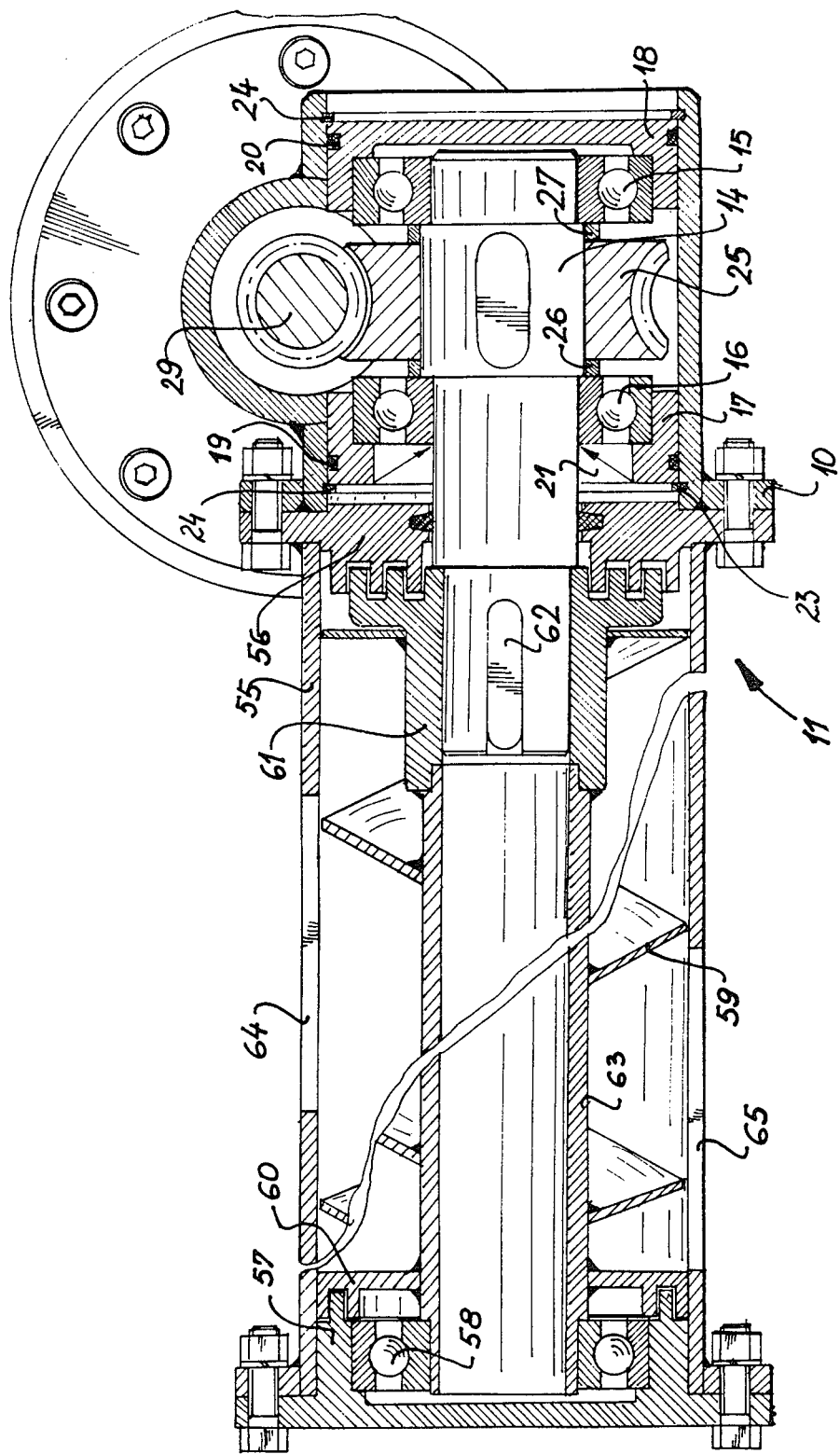
FIG. 5 is a cross-sectional view of a worm reduction gear according to the invention as used in a worm-conveyer.

A worm reduction gear according to this invention has a casing 1 consisting of a tube 2, a tube 3, and a flange 4 welded together in a single three pieces or cast from piece, including supporting connections 5 (FIG. 2) for a steering wheel (not shown) a connection 8 (FIG. 3) for a hoist 9, and a connection 10 (FIG. 5) for, e.g., a worm conveyer 11.

Figure 1:
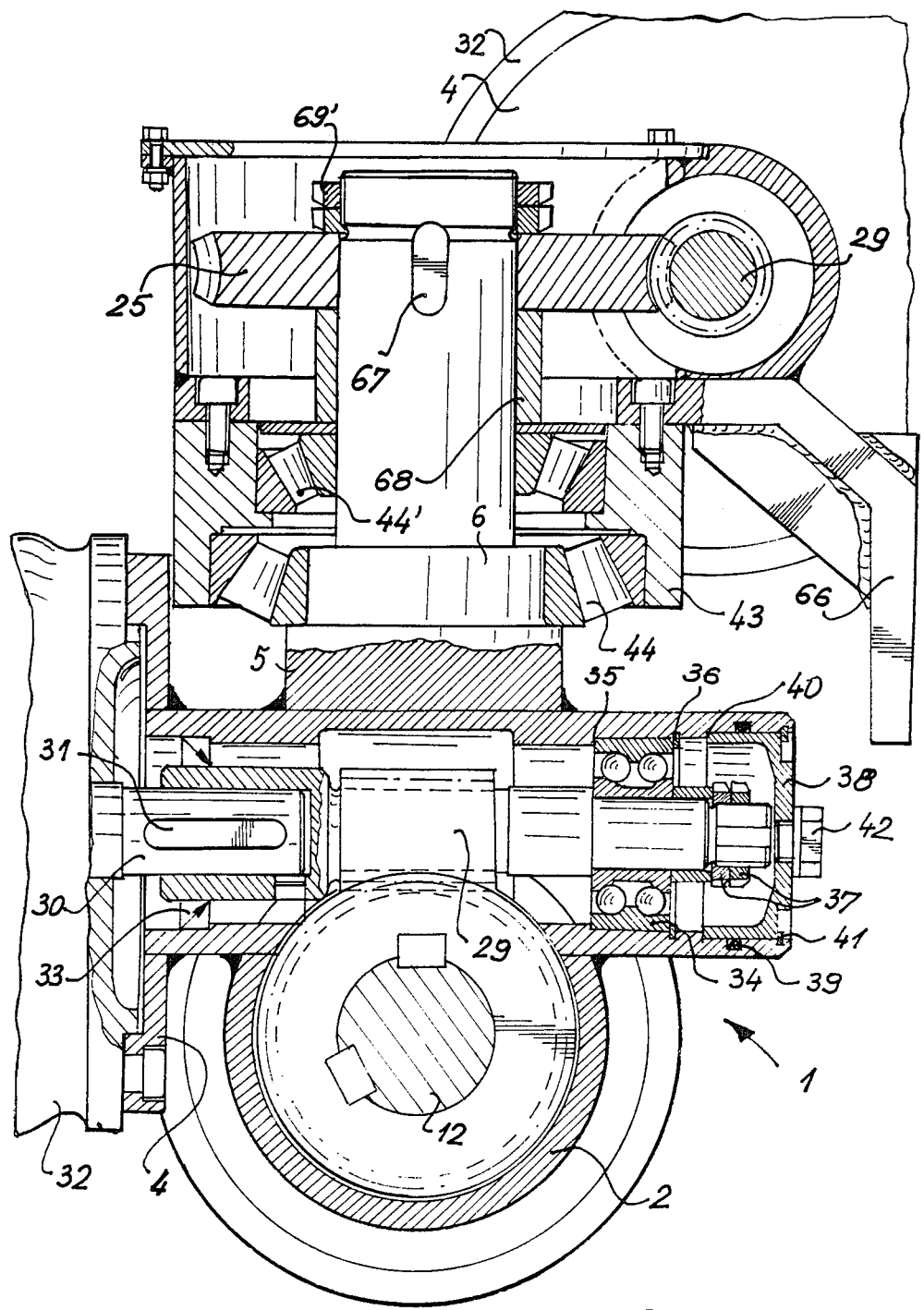
FIG. 1 is an elevational view partly broken away of a worm reduction gear, according to the invention, with a connection for a steering wheel.

Inserted in the casing 1 is a shaft 12 (FIG. 1), 13 (FIG. 3), 14 (FIG. 5) with bearings 15 and 16 on which there are centering bushes 17 or a centering cover 18 (FIG. 5) with round flange gaskets 19 and 20 and sealing ring 21 which are limited and fixed by two Seeger rings 23 and 24. Between the bearings 15 and 16 there is a worm wheel 25 with spacers 26 and 27 and a key 28. The worm wheel 25 meshes with the worm which is received in the tube 3 and fixed on the shaft 30 by a key 31 of an electromotor 32 and sealed by a seal 33. The other end of the worm 29 is fixed in an axial bearing 34 located between the seat 35 and the Seeger ring 36 and fastened by two bearing nuts 37, all covered by a cover 38 and sealed by a round gasket 39 between a seating 40 and a Seeger ring 41. The cover incorporates a bolt 42 at a point where the reduction gear is filled with oil. The bolt 42 also serves as a cover remover.

Figure 2:
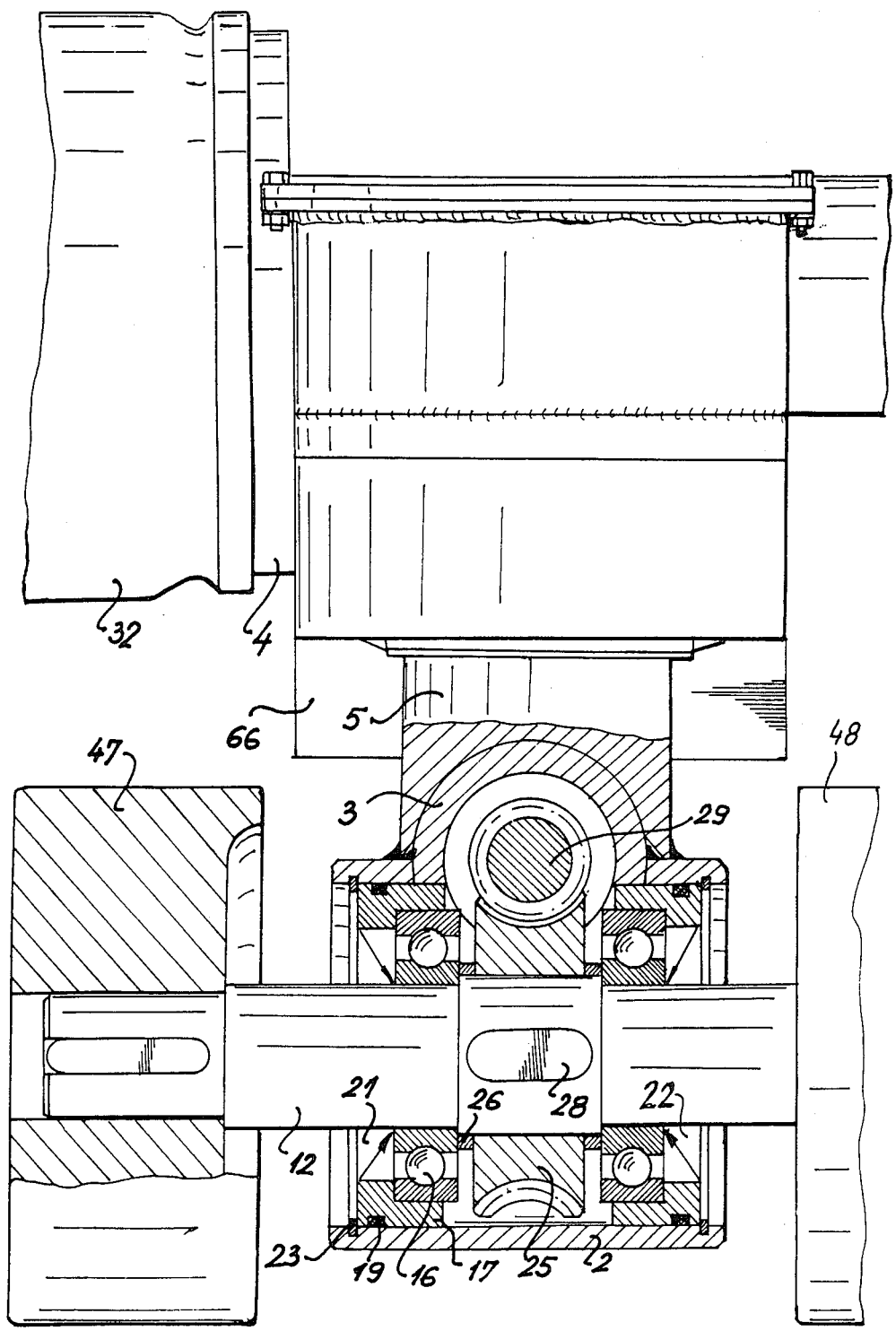
FIG. 2 is a side-elevational view partly broken away of a worm reduction gear, according to the invention.

If and when a supporting connection 5 for the steering wheel (not shown) is placed on the tube 3 the casing 43 incorporates the bearings 44 and 45 which are fixed through a spacer 46 on which another worm reduction gear 1 is located designed for left and right steering of a vehicle or a machine riding on wheels 47 and 48 (FIG. 2).

Figure 3:
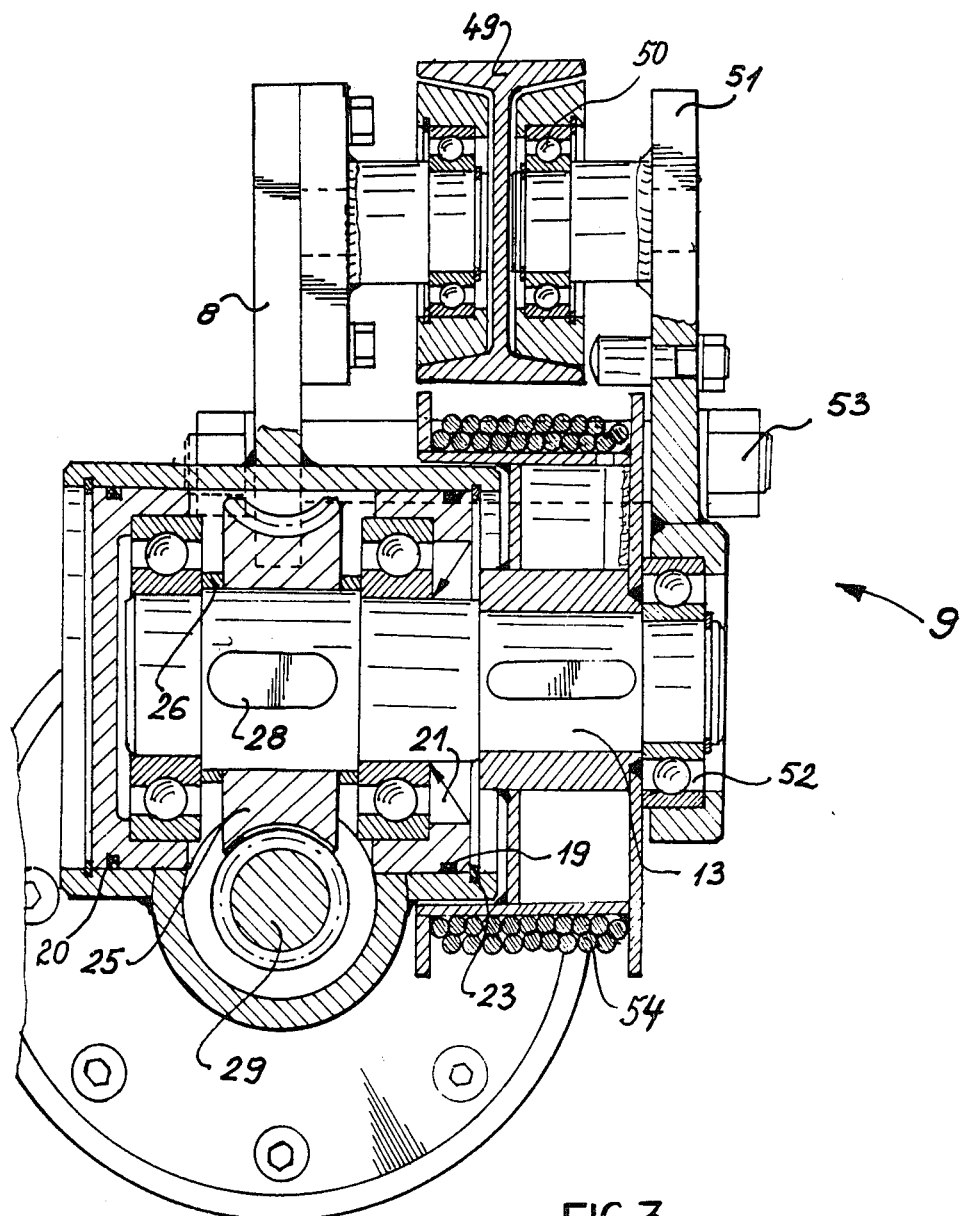
FIG. 3 is an elevational view of a worm reduction gear according to the invention, with a mobile hoist fixed to it.
Figure 4:
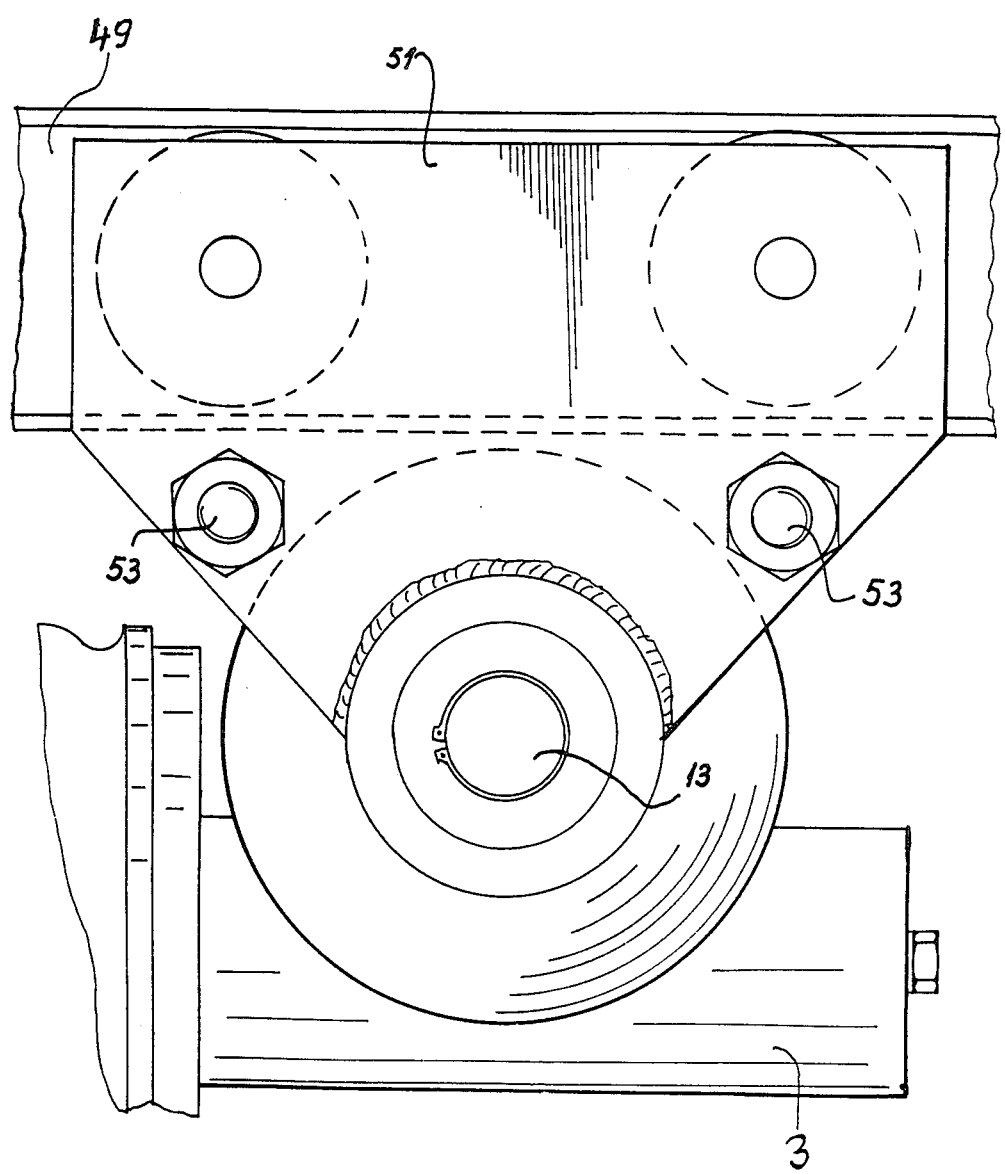
FIG. 4 is a side-elevational view of a worm reduction gear, according to the invention, with a mobile hoist fixed to it.

When a worm reduction gear is suspended on a guiding and supporting section 49 it has two two supports with plugs and bearings 50 (FIG. 3) and, in addition if necessary, another support 51 with a bearing 52 which are fastened by two spacing screws 53 between which on the shaft 13 a winding drum with a string 54 is located (FIG. 3). Further, the reduction gear can also be designed for other applications like the already shown worm conveyer with worm reduction gear 11 (FIG. 5)—a casing 55, fastened to a flange 10 by a bolt, with a labyrinth flange 56 and a labyrinth cover 57 in which there is a bearing 58 supporting a worm 59 with counter-labyrinth 60, while the other leg of the labyrinth hub 61 is fixed on a shaft 14 by a key 62, between which there is, preferably, a tubular shaft 63. The worm conveyer has an inlet opening 64 and an outlet opening 65.

A worm reduction gear according to the invention with connections works as follows:

An electromotor 32 drives preferably through a key 31 and carries a worm 29 which is guided and axially held in position by a bearing 34 and which is tightly enclosed by a worm wheel 25 which drives a shaft 12 through keys 28, and when two wheels 47 and a supporting base 5 are fastened to the shaft and when another worm reduction gear for left and right turning is applied here, then the worm reduction gear carries, steers, and drives the machine simultaneously. A worm reduction gear used as a hoist, however, carries and drives the load. And further, a worm reduction gear can be applied only as the driving part of a machine.

I claim:

1. A worm reduction gear, comprising:
   a casing formed by:
   a first open-ended cylindrical tube having a first axis,
   a second open-ended cylindrical tube having a second axis perpendicular to said first axis and welded to said first tube laterally thereof, and
   a respective flange welded on a respective end of each of said tubes and lying in a plane perpendicular to the respective axis flush with a respective end face of the respective tube;
   a wormwheel shaft extending along the axis of said first tube;
   a wormwheel keyed to said wormwheel shaft in said first tube and extending into said second tube;
   a plurality of spacers flanking said wormwheel and centering said wormwheel in said first tube;
   respective bearings flanking said spacers and rotatably journaling said wormwheel shaft in said first tube;
   respective centering bushes abutting each of said bearings and disposed between each bearing and a respective end of said first tube;
   respective retaining rings seated in grooves formed adjacent said ends of said first tube for holding said centering bushes against axial displacement in said first tube;
   respective seals received in each of said bushes and engaging an inner wall of said first tube between each of said retaining rings and the bearing abutted by the respective bush;
   a worm shaft received in said second tube;
   a worm keyed to said wormshaft in said second tube and meshing with said wormwheel;
   bearing means journaling said worm shaft in said second tube; and
   cover means for closing at least one of the ends of at least one of said tubes.

2. The worm reduction gear defined in claim 1 wherein said cover means is provided at one end of said second tube and encloses a pair of nuts anchoring said bearing means against axial displacement in said second tube, said second tube being formed with one of said flanges at an end thereof opposite the end provided with said cover means and through which said wormshaft is connectable to a drive.

3. The worm reduction gear defined in claim 2 wherein said wormwheel shaft projects out through at least one end of said first tube.

4. The worm reduction gear defined in claim 3 wherein said end of said first tube through which said wormwheel shaft projects is formed with said flange.

* * * * *